United States Patent [19]

Masumoto

[11] Patent Number: 5,115,081
[45] Date of Patent: May 19, 1992

[54] PROCESS FOR PRODUCING COPOLYCARBONATE OLIGOMER FROM DICHLOROFORMATE

[75] Inventor: Mituhiko Masumoto, Osaka, Japan

[73] Assignee: Mitsubishi Gas Chemical Co., Inc., Tokyo, Japan

[21] Appl. No.: 620,797

[22] Filed: Dec. 3, 1990

Related U.S. Application Data

[60] Division of Ser. No. 453,168, May 26, 1988, which is a continuation of Ser. No. 198,891, May 26, 1988, abandoned.

Foreign Application Priority Data

May 27, 1987 [JP] Japan ................. 62-127988

[51] Int. Cl.$^5$ ............................................. C08G 64/28
[52] U.S. Cl. ..................... 528/196; 528/198; 528/199; 528/204
[58] Field of Search ............... 528/196, 198, 199, 204

[56] References Cited

U.S. PATENT DOCUMENTS 3,189,640  6/1965  Dietrich et al.
3,255,230  6/1966  Kurkjy et al.
4,501,875  2/1985  Mark .................... 528/196

OTHER PUBLICATIONS

Encyclopedia of Polymer Science and Technology, vol. 10, pp. 716-721, 1969.

*Primary Examiner*—Harold D. Anderson
*Attorney, Agent, or Firm*—Sughrue, Mion, Zinn, Macpeak & Seas

[57] ABSTRACT

A process for producing a dichloroformate of a tetrahalogenated bisphenol by an interfacial process in a high yield and a high content and a process for producing an aromatic copolycarbonate oligomer by a solution process using the resulting dichloroformate monomer are disclosed. The first process comprises adding a catalyst for chloroformate formation to a tetrahalogenated bisphenol in an amount of from $1 \times 10^{-4}$ to $1 \times 10^{-1}$ mol per mol of the bisphenol and consecutively adding a halogenated carbonyl to effect reaction while controlling the pH of the reaction system between 10 and 12 by consecutive addition of a basic inorganic compound to the reaction system. The copolycarbonate oligomer obtained using the dichloroformate monomer has high alternating regularity.

3 Claims, No Drawings

PROCESS FOR PRODUCING COPOLYCARBONATE OLIGOMER FROM DICHLOROFORMATE

This is a divisional of application Ser. No. 07/453,168 filed May 26, 1988 which in turn is a continuation of U.S. application Ser. No. 07/198,891 filed May 26, 1988, now abandoned.

FIELD OF THE INVENTION

This invention relates to a process for producing a dichloroformate of a tetrahalogenated bisphenol and a process for producing a copolycarbonate oligomer using the dichloroformate.

According to the process of this invention, a dichloroformate monomer can be produced in a high yield, and a copolycarbonate oligomer obtained therefrom has high regularity.

BACKGROUND OF THE INVENTION

Conventional techniques for producing an aromatic polycarbonate oligomer from a tetrahalogenated bisphenol through interfacial polymerization include a process for producing a halogenated aromatic polycarbonate oligomer in the presence of a chain terminator as disclosed in Japanese Patent Application (OPI) No. 52834/73 (the term "OPI" as used herein means "unexamined published Japanese patent application") and a process for producing a halogenated aromatic polycarbonate oligomer without using a chain terminator as disclosed in Japanese Patent Application OPI No. 84894/76. The former process produces virtually no chloroformate compounds. According to the latter process, the resulting polycarbonate oligomer carries a hydroxyl group other than a chloroformate group and also has a broad molecular weight distribution.

On the other hand, a dichloroformate of a bisphenol can be prepared by a process described in *Macromol. Chem.*, Vol. 57, 1 (1962), which comprises dissolving a bisphenol and excess phosgene in toluene, adding N,N-dimethylaniline, etc., to the solution to effect reaction at a low temperature around $-10°$ C. for 5 to 6 hours, and driving the excess of phosgene out of the reaction system to obtain a dichloroformate. However, this technique entails high cost arising from the use of low temperatures and the like and is not, therefore, practical.

Under these circumstances, since there has been proposed no process for producing a dichloroformate monomer of a tetrahalogenated bisphenol in a high yield at a high content under practical conditions, it has been difficult to obtain a copolycarbonate oligomer of high regularity from a tetrahalogenated bisphenol and a general bisphenol.

SUMMARY OF THE INVENTION

One object of this invention is to provide a process for producing a dichloroformate monomer of bisphenol in a high yield or at a high content by a practical interfacial process.

Another object of this invention is to provide a process for producing a copolycarbonate oligomer having high alternating regularity.

As a result of extensive investigations, it has now been found that the above objects of this invention can be accomplished by using a tetrahalogenated bisphenol as a starting compound and controlling reaction conditions including a catalyst within specific ranges. It has been further found that a copolycarbonate oligomer having high alternating regularity can be obtained by reacting the aforesaid dichloroformate monomer with another bisphenol. The present invention has been completed based on these findings.

This invention relates to a process for producing a dichloroformate of a tetrahalogenated bisphenol represented by formula (I):

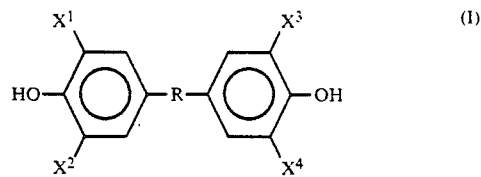

wherein R represents a straight or branched chain or cyclic alkylidene group, an aryl-substituted alkylene group, an aryl group, —O—, —CO—, —S—, —SO— —SO$_2$—; and X$^1$, X$^2$, X$^3$, and X$^4$ each represents a bromine atom or a chlorine atom.

by an interfacial process, which comprises adding a catalyst for chloroformate formation to the tetrahalogenated bisphenol of formula (I) in an amount of from $1 \times 10^{-4}$ to $1 \times 10^{-1}$ mol per mol of the bisphenol and successively adding a halogenated carbonyl to effect reaction while controlling the pH of the reaction system between 10 and 12 by successive addition of a basic inorganic compound to the reaction system.

In a preferred embodiment of the above-described process, said catalyst for chloroformate formation is a quaternary ammonium salt or a quaternary phosphonium salt.

This invention further relates to a process for producing an aromatic polycarbonate oligomer having an average degree of polymerization of from 2 to 20 by a solution process, which comprises reacting the aforesaid dichloroformate of a tetrahalogenated bisphenol with a bisphenol represented by formula (II):

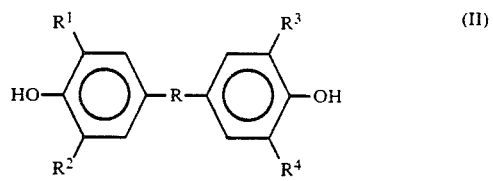

wherein R is as defined above; and R$^1$, R$^2$, R$^3$, and R$^4$ each represents a hydrogen atom or a lower (C$_1$-C$_4$) alkyl group.

DETAILED DESCRIPTION OF THE INVENTION

The term "interfacial process" as used herein means a reaction process using a mixed solvent system forming two phases of water and a water-immiscible solvent as is well known for interfacial polymerization of polycarbonate. The water-immiscible solvent is an organic solvent which, when mixed with water, forms an organic phase separated from an aqueous phase. Preferred water-immiscible solvents are those which are inert to the reaction, capable of dissolving phosgene and also capable of dissolving a dichloroformate of a tetrahalogenated bisphenol. Typical examples of such solvents include dichloromethane, 1,2-dichloroethane, 1,1,2,2-tetrachloroethane, chloroform, carbon tetrachloride, monochlorobenzene, dichlorobenzene, etc.

Included in the tetrahalogenated bisphenol represented by formula (I) are 2,2-bis(3,5-dibromo-4-hydroxyphenyl)propane, 2,2-bis(3,5-dichloro-4-hydroxyphenyl)propane, bis(3,5-dibromo-4-hydroxyphenyl)sulfone, bis(3,5-dichloro-4-hydroxyphenyl)sulfide, bis(3,5-dibromo-4-hydroxyphenyl)ether, bis(3,5-dichloro-4-hydroxyphenyl)cyclohexane, 1-phenyl-1,1-bis(3,5-dibromo-4-hydroxyphenyl)ethane, etc.

Included in the bisphenol represented by formula (II) are 2,2-bis(4-hydroxyphenyl)propane, 2,2-bis(3,5-dimethyl-4-hydroxyphenyl)propane, bis(4-hydroxyphenyl)sulfone, bis(4-hydroxyphenyl)sulfide, bis(4-hydroxyphenyl)ether, 1,1-bis(4-hydroxyphenyl)cyclohexane, 1,1-bis(4-hydroxyphenyl)-1-phenylethane, bis(3,5-dimethyl-4-hydroxyphenyl)sulfone, bis(3-dimethyl-4-hydroxyphenyl)sulfone, bis(4-hydroxyphenyl)ketone, bis(4-hydroxyphenyl)methane, bis(4-hydroxyphenyl)sulfoxide, 1,1-bis(4-hydroxyphenyl)ethane, 2,2-bis(4-hydroxyphenyl)butane, bis(4-hydroxyphenyl)diphenylmethane, and so on.

The halogenated carbonyl to be used in the present invention includes phosgene and trichloromethyl chloroformate ($Cl_3COCOCl$), with the former being usually employed. Introduction of phosgene is generally carried out in the gaseous or liquid form or in the form of a solution in the above-recited water-immiscible solvent.

Any of the known catalysts for chloroformate formation can be used in the present invention. Preferred of them are quaternary ammonium salts, e.g., trimethylbenzylammonium chloride, tetramethylammonium chloride, triethylbenzylammonium chloride, tetraethylammonium chloride, etc.; and quaternary phosphonium salts, e.g., triphenyl-n-butylphosphonium bromide, triphenylmethylphosphonium bromide, etc. The catalyst is added to the reaction system in an amount of from $1 \times 10^{-4}$ to $1 \times 10^{-1}$ mol, and preferably from $5 \times 10^{-4}$ to $1 \times 10^{-2}$ mol, per mol of the tetrahalogenated bisphenol.

The basic inorganic compound which can be used in the present invention includes potassium hydroxide, sodium hydroxide, lithium hydroxide, calcium hydroxide, sodium carbonate, sodium tertiary phosphate, etc.

The production of the dichloroformate of the present invention can be carried out by adjusting a system comprising prescribed amounts of the tetrahalogenated bisphenol of formula (I), a catalyst for dichloroformate formation, water, and a water-immiscible solvent at a pH of from 10 to 12 with a basic inorganic compound and introducing a halogenated carbonyl into the system over a period of from several minutes to several ten minutes under stirring while maintaining the reaction system at a temperature between 0° and 40° C., and preferably between 5° and 30° C. and at a pH between 10 and 12 by consecutive addition of the basic inorganic compound to the reaction system.

Since the decomposition loss of the halogenated carbonyl is very slight under the above-described reaction conditions, 5 to 15% excess theoretical of the halogenated carbonyl will suffice for obtaining the desired dichloroformate of the tetrahalogenated bisphenol.

It is essential that the tetrahalogenated bisphenol to be used has formula (I), and particularly that the 3,5-positions of each benzene ring should be substituted with a halogen atom. If in using an unsubstituted bisphenol, polymerization would proceed in the presence of the catalyst for chloroformate formation chiefly for reasons that steric hindrance by nucleus-substituting halogen atoms does not occur, resulting in the failure to obtain a product containing a dichloroformate monomer at high purity or high yield. Further, if the pH of the reaction system is out of the range of from 10 to 12, there result disadvantages such as a decrease in yield of a dichloroformate monomer, an increase in decomposition rate of phosgene, and a great increase in content of the terminal hydroxyl group.

According to the process of the present invention, a dichloroformate of a tetrahalogenated bisphenol can be obtained in a yield of from 80 to 90% or more based on the tetrahalogenated bisphenol used; the decomposition rate of phosgene is as low as from 8 to 11%; and the amount of the terminal unreacted hydroxyl group is 20 ppm or less. These reaction results indicate marked improvements over those attained under reaction conditions out of the scope of the present invention, i.e., 25 to 35% in yield, 40 to 47% in phosgene decomposition rate, and 7,200 to 12,000 ppm in terminal hydroxyl group content.

A copolycarbonate oligomer can be produced by using the thus obtained dichloroformate of the tetrahalogenated bisphenol, either in the form of the reaction mixed solution as prepared or in the form isolated therefrom. In the latter case, the isolated product is again dissolved in a solvent. To the solution of the dichloroformate are added a bisphenol represented by formula (II), a terminator, a basic compound, and a polymerization catalyst, e.g., a tertiary amine, and the system is subjected to interfacial polymerization in a usual manner. The conditions for the polymerization are conventionally known and are not particularly limited.

The present invention is now illustrated in greater detail with reference to Examples and Comparative Examples, but it should be understood that the present invention is not limited thereto. In these examples, all the percents are by weight unless otherwise indicated.

EXAMPLE 1

In a 100 l-volume reaction vessel were charged 9.8 kg (18.0 mol) of tetrabromobisphenol A (TBA), 30 l of water, 37 l of methylene chloride, 4 l of a 9% sodium hydroxide aqueous solution, and 4.9 g ($2.15 \times 10^{-2}$ mol) of triethylbenzylammonium chloride (TEBAC), and 3.8 kg of phosgene was added to the mixture over a period of 30 minutes while maintaining the mixture at a temperature of about 20° C. and at a pH of from 11.0 to 11.8. The pH adjustment during the reaction was effected by addition of a 35% sodium hydroxide aqueous solution. After completion of the reaction, the solvent was removed from the reaction mixture to obtain a white powder. The analytical values of the resulting powder are shown in Table 1.

EXAMPLE 2

The same procedure as in Example 1 was repeated, except for replacing TEBAC with 9.8 g ($5.28 \times 10^{-2}$ mol) of trimethylbenzylammonium chloride (TMBAC). The analytical values of the resulting powder are shown in Table 1.

EXAMPLE 3

The same procedure as in Example 1 was repeated, except for replacing TEBAC with 19.6 g ($12.7 \times 10^{-2}$ mol) of tetramethylammonium bromide (TMAB). The analytical values of the resulting powder are shown in Table 1.

COMPARATIVE EXAMPLE 1

The same procedure as in Example 1 was repeated, except for using no TEBAC. The analytical values of the resulting powder are shown in Table 1.

COMPARATIVE EXAMPLE 2

The same procedure as in Example 1 was repeated, except for replacing TEBAC with 3 g ($2.97 \times 10^{-2}$ mol) of triethylamine (TEA). The analytical values of the resulting powder are shown in Table 1.

COMPARATIVE EXAMPLE 3

The same procedure as in Example 1 was repeated, except that the sodium hydroxide aqueous solution was added to the reaction system all at once in the initial stage of the reaction. The analytical values of the resulting powder are shown in Table 1.

rate the solvent to dryness to obtain a copolycarbonate oligomer as a white powder.

The analytical values of the resulting polycarbonate oligomer are shown in Table 2.

EXAMPLE 5

A copolycarbonate oligomer was prepared in the same manner as in Example 4, except that the reaction mixture as used in Example 4 was replaced with the same reaction mixture as obtained in Example 2, that BPA was replaced with 2.9 kg of bisphenol S (BPS), and that the amount of PTBP was changed to 985 g. The analytical values of the resulting polycarbonate oligomer are shown in Table 2.

EXAMPLE 6

A copolycarbonate oligomer was prepared in the same manner as in Example 4, except that the reaction mixture as used in Example 4 was replaced with the same reaction mixture as obtained in Example 3, that

TABLE 1

|  | Example No. | | | Comparative Example No. | | |
|---|---|---|---|---|---|---|
|  | 1 | 2 | 3 | 1 | 2 | 3 |
| pH of Reaction System | 11.2-11.8 | 11.2-11.8 | 11.0-11.8 | 11.0-11.8 | 11.0-11.8 | 12.4-13.2 |
| Catalyst | TEBA | TMBA | TMAB | — | TEA | TEBA |
| Amount (mol) of Catalyst | $2.15 \times 10^{-2}$ | $5.28 \times 10^{-2}$ | $12.7 \times 10^{-2}$ | — | $2.97 \times 10^{-2}$ | $2.15 \times 10^{-2}$ |
| Decomposition Rate of Phosgene (%) | 8 | 10 | 11 | 40 | 45 | 47 |
| Ratio of Unreacted Bisphenol to Charged Bisphenol | trace | trace | trace | 17 | 2 | 1.5 |
| Dichloroformate Monomer Content (%) | 92 | 85 | 83 | 35 | 30 | 28 |
| Average Molecular Weight | 710 | 755 | 773 | 628 | 1119 | 1200 |
| Terminal-OH (ppm) | 20 or less | 20 or less | 20 or less | $12.0 \times 10^3$ | $8.0 \times 10^3$ | $7.2 \times 10^3$ |

EXAMPLE 4

The same reaction mixture after blowing of phosgene as obtained in Example 1 was transferred to a 150 l-volume reaction vessel, and a solution of 19 l of a 9% sodium hydroxide aqueous solution, 2.2 kg of bisphenol A (BPA), and 1.65 kg of p-t-butylphenol in 15 l of methylene chloride was added to the mixture. Then, 450 g of TEA was added thereto, followed by stirring for about 1 hour to effect polymerization.

The polymerization mixture was separated into an aqueous phase and an organic phase, and the organic phase was repeatedly washed with water until the washing became neutral. The aqueous layer was again separated, and the organic layer was heated to evapo- BPA was replaced with 2.5 kg of thiobisphenol (TDP), and that PTBP was replaced with 1.94 kg of tribromophenol (TBP). The analytical values of the resulting polycarbonate oligomer are shown in Table 2.

EXAMPLE 7

A copolycarbonate oligomer was prepared in the same manner as in Example 4, except for replacing 1.65 kg of PTBP with 4.7 kg of hydroxyphenyl sulfonate tetrabutylphosphonium salt (SP). The analytical values of the resulting polycarbonate oligomer are shown in Table 2.

TABLE 2

| Example No. | Dichloroformate Monomer | Bisphenol (II) | Terminator | Degree of Polymerization | TBA:Bisphenol (II) (II) Molar Ratio in Co-oligomer |
|---|---|---|---|---|---|
| 4 | Example 1 | PBA | PTBP | 5 | 3.26:1.74 |
| 5 | Example 2 | BPS | PTBP | 9 | 5.48:3.52 |
| 6 | Example 3 | TDP | TBP | 10 | 6.13:3.87 |
| 7 | Example 1 | BPA | SP* | 5 | 3.25:1.75 |

Note:
SP*: SP:HO-φ-SO$_3$PBu$_4$ (φ: phenylene group; Bu: butyl group)

According to the process of the present invention, a dichloroformate of a tetrahalogenated bisphenol can be obtained by an interfacial process including usual blowing of phosgene in a high yield while suppressing decomposition of phosgene. A copolycarbonate oligomer can be produced easily by using the dichloroformate monomer thus obtained. The resulting copolycarbonate oligomer has high alternating regularity and exhibits excellent compatibility and the like when used as a compounding additive to other resins.

While the invention has been described in detail and with reference to specific embodiments thereof, it will be apparent to one skilled in the art that various changes and modifications can be made therein without departing from the spirit and scope thereof.

What is claimed is:

1. A process for producing an aromatic copolycarbonate oligomer having an average degree of copolymerization of from 2 to 20 by an interfacial process, which comprises:

(a) adding a catalyst for chloroformate production to a tetrahalogenated bisphenol represented by formula (I):

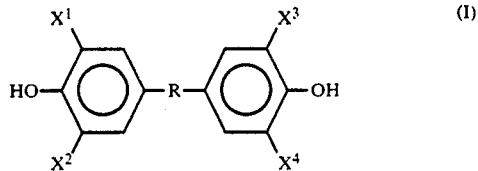

wherein R represents a straight or branched chain or cyclic alkylidene group, an aryl-substituted alkylene group, an arylene group, —O—, —CO—, —S—, —SO— or —SO$_2$—; and $X^1$, $X^2$, $X^3$, and $X^4$ each represents a bromine atom or a chlorine atom, in an amount of from $1 \times 10^{-4}$ to $1 \times 10^{-1}$ mol per mol of the bisphenol and consecutively adding phosgene to effect reaction while controlling pH of the reaction system to between 10 and 12 by consecutive addition of a basic inorganic compound to the reaction system, thereby forming a dichloroformate monomer solution, and then (b) adding a bisphenol represented by formula (II):

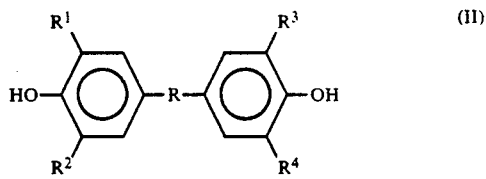

wherein R is the same as defined above, and $R^1$, $R^2$, $R^3$, and $R^4$ each represents a hydrogen atom or a lower alkyl group, and a catalyst for polymerization to the dichloroformate monomer solution obtained in step (a) above to effect reaction, thereby forming the aromatic copolycarbonate oligomer.

2. A process as claimed in claim 1, wherein a terminator is further added to the dichloroformate monomer solution obtained in step (a).

3. A process as claimed in claim 1, wherein said catalyst for chloroformate formation is a quaternary ammonium salt or a quaternary phosphonium salt.

* * * * *